(12) United States Patent
Wilson (10) Patent No.: US 11,309,569 B1
(45) Date of Patent: Apr. 19, 2022

(54) MICROWATT FUEL CELL STACK

(71) Applicant: Triad National Security, LLC, Los Alamos, NM (US)

(72) Inventor: Mahlon Scott Wilson, Los Alamos, NM (US)

(73) Assignee: Triad National Security, LLC, Los Alamos, NM (US)

(*) Notice: Subject to any disclaimer, the term of this patent is extended or adjusted under 35 U.S.C. 154(b) by 219 days.

(21) Appl. No.: 16/541,228

(22) Filed: Aug. 15, 2019

Related U.S. Application Data (60) Provisional application No. 62/730,443, filed on Sep. 12, 2018.

(51) Int. Cl.
| | |
|---|---|
| *H01M 8/241* | (2016.01) |
| *H01M 8/0228* | (2016.01) |
| *H01M 8/0206* | (2016.01) |
| *H01M 8/0215* | (2016.01) |
| *H01M 8/1023* | (2016.01) |
| *H01M 8/1039* | (2016.01) |
| *H01M 8/2483* | (2016.01) |
| *H01M 8/0276* | (2016.01) |
| *H01M 8/10* | (2016.01) |

(52) U.S. Cl.
CPC ......... *H01M 8/241* (2013.01); *H01M 8/0206* (2013.01); *H01M 8/0215* (2013.01); *H01M 8/0228* (2013.01); *H01M 8/0278* (2013.01); *H01M 8/1023* (2013.01); *H01M 8/1039* (2013.01); *H01M 8/2483* (2016.02); *H01M 2008/1095* (2013.01)

(58) Field of Classification Search
CPC .. H01M 8/241; H01M 8/2483; H01M 8/0206; H01M 8/0215; H01M 8/0228; H01M 8/0278; H01M 8/1023; H01M 8/1039
See application file for complete search history.

(56) References Cited

U.S. PATENT DOCUMENTS

| | | | |
|---|---|---|---|
| 4,826,741 A * | 5/1989 | Aidhart | H01M 8/241 |
| | | | 429/421 |
| 5,514,486 A | 5/1996 | Wilson | |
| 5,595,834 A | 1/1997 | Wilson et al. | |
| 2003/0232234 A1* | 12/2003 | Cisar | H01M 8/0206 |
| | | | 429/437 |

(Continued)

OTHER PUBLICATIONS

K. Chintam et al., "Microwatt Fuel Cell for Long-Term and Wide Ambient Temperature Range Operation," presented at the AiMES (Americas International Meeting on Electrochemistry and Solid State Science) 2018 meeting (Sep. 30, 2018).

*Primary Examiner* — Jimmy Vo
(74) *Attorney, Agent, or Firm* — LeonardPatel PC; Michael A. Leonard, II; Sheetal S. Patel (57) ABSTRACT

A microwatt fuel cell stack that demonstrates a wide range temperature tolerance, low reactant cross-over and leakage, low internal leakage current, and/or effective water transport is disclosed. Both $H_2$ and $O_2$ may be supplied directly to the fuel cell stack (i.e., dead-ended). One-piece gas diffusion electrodes (GDEs) may serve as both the active electrode and manifold port. Water removal may be accomplished by permeation through the membrane to "fins" exposed by notches in the bipolar plates and gaskets.

19 Claims, 10 Drawing Sheets

(56) References Cited

U.S. PATENT DOCUMENTS

| | | | |
|---|---|---|---|
| 2005/0084734 A1* | 4/2005 | Kobayashi | H01M 8/241 429/480 |
| 2006/0014074 A1* | 1/2006 | Tsuji | H01M 8/043 429/49 |
| 2009/0239128 A1* | 9/2009 | Keyser | H01M 8/2483 429/432 |

* cited by examiner

MICROWATT FUEL CELL STACK

CROSS-REFERENCE TO RELATED APPLICATION

This application claims the benefit of U.S. Provisional Patent Application No. 62/730,443 filed Sep. 12, 2018. The subject matter of this earlier-filed application is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to fuel cells, and more particularly, to a microwatt fuel cell stack that demonstrates a wide range temperature tolerance, low reactant cross-over and leakage, low internal leakage current, and/or effective water transport.

BACKGROUND

Microwatt fuel cell stacks and systems are useful for providing long-term, continuous power to systems that experience a wide range of temperatures and relative humidity (RH) levels. These microwatt fuel cell stacks have advantages over traditional lithium-ion batteries in their potential for applications that require prolonged periods of storage or operation. The continuous discharge and cycling of lithium-ion batteries allows for a maximum lifetime of approximately 10 years with current technologies. This maximum lifetime disregards any potential issues with overcharging and limited operation at high temperatures. Conversely, microwatt fuel cells can have a lifetime of over a decade when fed with supplies of $H_2$ and $O_2$ in stationary applications.

Lithium-ion batteries also face fire hazards due to exothermal runaway from storing high energy densities. Microwatt fuel cell systems, on the other hand, store the reactants in separate vessels, and as such, are not subject to self-discharge or exothermal runaways. Any storage issues that may arise in the operation of a microwatt fuel cell will thus not lead to hazards to the degree possible with lithium-ion batteries. The service life, wide range of operating conditions, and safety of microwatt fuel cells are advantages over traditional lithium-ion batteries that have attracted interest for low power, long-term power sources.

Microwatt fuel cells are derived from proton exchange membrane fuel cells (PEMFCs) and provide the benefits of PEMFCs on a much smaller scale. However, this small scale is accompanied by its own set of challenges. In contrast to typical kilowatt-scale fuel cells for transportation applications, current microwatt fuel cell stacks encounter system challenges with gas reactant cross-over and leakage, as well as electronic conduction through the membrane, called internal leakage current.

The 2020 U.S. Department of Energy technical target for membrane internal leakage current is an equivalent DC resistance of 1000 $\Omega cm^2$, which would cause a normal 30-year $H_2$ reactant supply to dwindle down and last less than a year. This illustrates the magnitude of the issue with current technology. Moreover, consistent supplies of $O_2$ without cross-over are necessary to avoid dependence on air availability and purity. Since the stack reactants supplied are dead-ended and the system operates on a relatively small scale, necessary measures must be taken to prevent the buildup of water to prevent system failure. Accordingly, an improved microwatt fuel cell stack capable of long-term operation may be beneficial.

SUMMARY

Certain embodiments of the present invention may provide solutions to the problems and needs in the art that have not yet been fully identified, appreciated, or solved by conventional fuel cell technologies. For example, some embodiments of the present invention pertain to a microwatt fuel cell stack that demonstrates a wide range temperature tolerance, low reactant cross-over and leakage, low internal leakage current, and/or effective water transport.

In an embodiment, a fuel cell stack includes a plurality of fuel cells that each include a plurality of layers. The plurality of fuel cells each include a membrane and a first gasket on a side of the membrane. The first gasket includes a first gas diffusion electrode (GDE) that, in operation, is provided with a hydrogen gas supply via a hydrogen manifold. Each fuel cell of the plurality of fuel cells also includes a second gasket on an opposite side of the membrane with respect to the first gasket. The second gasket includes a second GDE that, in operation, is provided with an oxygen gas supply via an oxygen manifold. A water permeability coefficient of the first gasket and the second gasket is at least fifty times higher than a gas permeability coefficient of the first gasket and the second gasket.

In another embodiment, a fuel cell includes a membrane that includes a plurality of fins. The fuel cell also includes a first gasket on a side of the membrane. The first gasket includes a first GDE that, in operation, is provided with a hydrogen gas supply via a hydrogen manifold. The fuel cell further includes a second gasket on an opposite side of the membrane with respect to the first gasket. The second gasket includes a second GDE that, in operation, is provided with an oxygen gas supply via an oxygen manifold. The first gasket and the second gasket each include at least one notch such that respective membrane fins are exposed by the at least one notch in the first gasket and the second gasket. A water permeability coefficient of the first gasket and the second gasket is at least fifty times higher than a gas permeability coefficient of the first gasket and the second gasket.

In yet another embodiment, a microwatt fuel cell includes a membrane that includes a plurality of fins. The microwatt fuel cell also includes a first gasket on a side of the membrane. The first gasket includes a first GDE that, in operation, is provided with a hydrogen gas supply via a hydrogen manifold. The microwatt fuel cell further includes a second gasket on an opposite side of the membrane with respect to the first gasket. The second gasket includes a second GDE that, in operation, is provided with an oxygen gas supply via an oxygen manifold. The first GDE and the second GDE each include a tongue, a throat, and a head. The tongue and the throat connect the head of the first GDE and the second GDE to the hydrogen manifold and the oxygen manifold, respectively. A water permeability coefficient of the first gasket and the second gasket is at least fifty times higher than a gas permeability coefficient of the first gasket and the second gasket.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a microwatt fuel cell stack that demonstrates a wide range temperature tolerance, low reactant cross-over and leakage, low internal leakage current, and/or effective water transport. Such embodiments may have long operating lives in excess of 30 years. This allows small systems to be powered that are difficult to access or inaccessible, for example.

In some embodiments, both $H_2$ and $O_2$ are supplied directly to the fuel cell stack (i.e., dead-ended), and air is not provided. One-piece gas diffusion electrodes (GDEs) may serve as both the active electrode and manifold port. Some embodiments also have a symmetrical design, where the anode and cathode GDEs and manifolds are identical. Water removal via the membranes may be enhanced by membrane "fins" exposed by notches in the bipolar plates and gaskets. In some embodiments, the bipolar plates and endplates include nitrided, platinum-coated, or gold-coated titanium, the membranes include one or two layers of Nafion™ 117 or Nafion™ 1110, or multiple layers of Nafion™ XL (i.e., at least one layer of a sulfonated tetrafluoroethylene-based fluoropolymer-copolymer), and the GDEs may include platinum black, which is a fine powder of platinum with good catalytic properties.

Figure 1A:
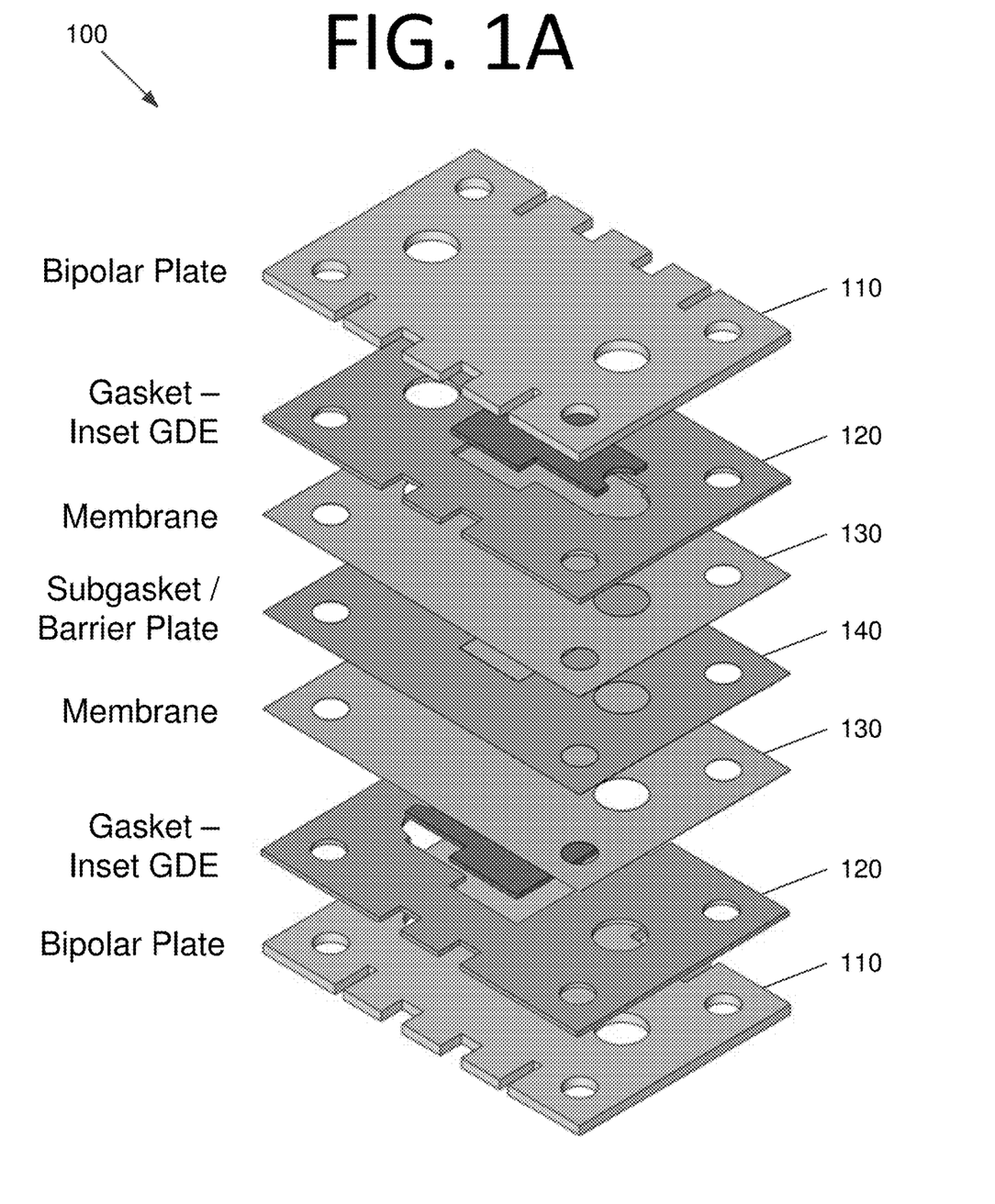
FIG. 1A is an exploded perspective view illustrating plates of a microwatt fuel cell, according to an embodiment of the present invention.

FIG. 1A is an exploded perspective view illustrating plates of a microwatt fuel cell 100, according to an embodiment of the present invention. In some embodiments, microwatt fuel cell 100 may be quite small. For instance, in a prototype of the depicted embodiment, fuel cell stack 100 had a footprint of 0.5"×0.75" (12.7 mm×19.1 mm) with an active area of 4 mm×5 mm (0.2 cm$^2$). However, any desired dimensions, footprint, and/or active area may be used without deviating from the scope of the invention.

Microwatt fuel cell 100 includes a pair of bipolar plates 110, a pair of gaskets 120, a pair of membranes 130, and a subgasket/barrier plate 140 (optional in some embodiments, also referred to herein as a "barrier plate"). In some embodiments, bipolar endplates may be made from titanium, and may be uncoated, nitrided, or coated with platinum or gold. Cell 100 is stackable with other cells in some embodiments, potentially increasing power output and storage.

It should be noted that in a stack of cells, each cell shares bipolar plates with the cell above and below it, with the exception of the top and bottom cells. The top cell uses upper endplate 150 (see FIG. 1B) as its top plate. The bottom cell uses lower endplate 160 (see FIG. 1B) as its bottom plate.

Figure 1B:
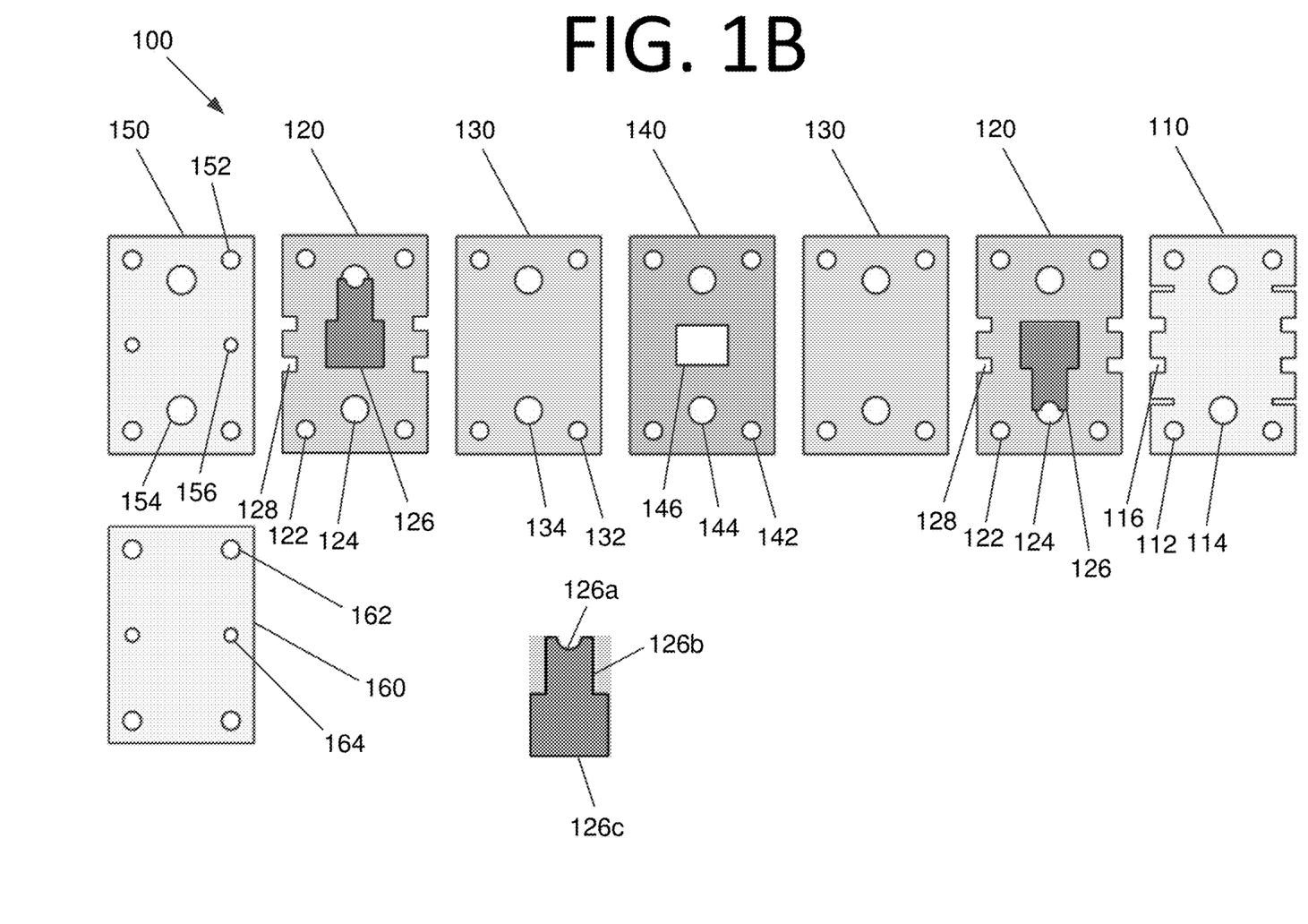
FIG. 1B is a disassembled top view illustrating the plates of the microwatt fuel cell, according to an embodiment of the present invention.

FIG. 1B is a disassembled top view illustrating the plates of microwatt fuel cell 100, according to an embodiment of the present invention. In addition to the components of cell 100 itself, an upper endplate 150 and a lower endplate 160 are shown. Tapped holes 156, 164 in endplates 150, 160, respectively, are provided for the attachment of electrical power leads and voltage sense leads for diagnostics and monitoring. Upper endplate 150 and lower endplate 160 are included at the top and bottom of the stack, respectively, which is more clearly shown in upper and lower endplates 250, 260 of FIG. 2. Each plate has respective holes 112, 122, 132, 142, 152, 162 for tie bolts or any other suitable securing mechanism without deviating from the scope of the invention. In this embodiment, endplate 150 has tapped holes 154 for attaching two tube fittings (not shown)—one for hydrogen and the other for oxygen. All other plates except for lower endplate 160 also have respective holes 114, 124, 134, 144, 154 to define the manifold passageways (one for $H_2$ and one for $O_2$) that enable respective reactant gases to pass through the stack to each respective cell.

Gaskets 120 are oriented in opposite directions with respect to one another such that a respective GDE 126 is properly oriented to interface with either the $H_2$ or the $O_2$ manifold, serving as both the active electrode and manifold port. In some embodiments, GDEs 126 may have a nominal platinum loading of 2-4 mg/cm$^2$ for both the anode and the cathode for durable operation. In some embodiments, anode and cathode GDEs 126 are identical due to a symmetrical design. In certain embodiments, gaskets 120 are acrylic tape adhesives, having high water permeability but low gas permeability. Some example acrylic adhesives include, but are not limited to, 415 and 9500PC double-sided tapes by 3M®. The water appears to diffuse through the gasket material to aid the membranes in water removal the cell, thus extending the low temperature operating range of the cell where water removal becomes the limiting factor in maintaining operation. However, it should be noted that acrylic adhesives may ooze over time. In some embodiments, gaskets 120 are made from a polyester fabric-reinforced synthetic rubber and fluoropolymer elastomer (e.g., Viton®), which readily tolerates the high temperature regimes, but limits water removal (and hence performance) at the lower temperature ranges unless other water removal options are employed.

Consequently, gasket materials that selectively transport water over gases such as $H_2$ and $O_2$ may be desirable to extend the operating temperature range of the microwatt fuel cell stack. Certain polyurethanes (elastomers—e.g., ether-type thermoplastic polyurethanes (TPUs)) may also provide high water permeability and low gas permeability. Indeed, the water permeability coefficient in some polyurethanes is three orders of magnitude higher than the gas permeability coefficient. Such polyurethanes tend to do well around room temperature and at colder temperatures. However, they are susceptible to a large compression set and deform at higher temperatures. Due to the difficulty of identifying elastomers with both a wide temperature range tolerance and a high water-to-gas permeability coefficient ratio, an alternative strategy is to utilize a composite gasket including materials that separately provide these two desirable traits. For example, Nylon®, which has a high permeability ratio but is not an elastomer, can be paired with silicone, which is an elastomer with a wide operating temperature range but poor permeability ratio, to form a gasket structure with these desirable characteristics.

The fitting that is used to supply each gas is arbitrary since the stack will function regardless of which fitting and corresponding gas manifold passageways are used to supply $H_2$ or $O_2$, so long as one fitting supplies one gas and the other fitting supplies the other. In other words, the anode ($H_2$) and cathode ($O_2$) GDEs and manifolds are identical in this embodiment. Naturally, the electrical output polarity of the stack switches if the gas connections are swapped.

Whereas conventional fuel cell stacks have manifold port structures that provide gas access into the cells and sealing surfaces for the membranes and gaskets to prevent leaks overhead between the manifold and the other side of the cell, each GDE 126 serves as both an active electrode and a manifold port in this embodiment. Gas flows from a tongue 126a through a throat 126b and up to a head 126c (shaped as a thick "T") of GDE 126. Throat 126b is flush with gasket 120 and the same compressed thickness in this embodiment, thus preventing any gaps and leakage between the overlying membrane and opposing gasket 120. Unlike conventional manifolding, in some embodiments, the entire periphery or inner annular region of the GDE serves as the manifold port. In this embodiment, just throat 126b of GDE 126 does so.

"Manifolding" as used herein describes the overall approach of how the reactants are delivered to the individual cells. For example, the stacks described herein, and indeed, most stacks for that matter, are "internally" manifolded with gaskets and bipolar plates effectively defining the manifolds. Conversely, some industrial stacks are "externally" manifolded, meaning that external piping and fittings deliver the reactants to each cell, similar to a car engine intake manifold. In either case, the "manifolds" themselves are the passageways or gas conduits that deliver the reactant gases to the cells throughout the stack. The manifold "ports" are the connections from the manifolds into the cells.

Tongue 126a and throat 126b of GDE 126 connects the active area (i.e., head 126c) to the manifold region. Tongue 126a and throat 126b facilitate reactant access and a gap-free, but compressible, seal area to prevent the reactants from cross-leaking into one another. This unique configuration simplifies manifold porting and provides effective sealing. Thus, GDE 126 provides both gas access and sealing functions.

Heads 126c of GDEs 126 constitute the active area and are proximate to one another due to a suitably sized opening 146 in subgasket/barrier plate 140, with only membranes 130 therebetween. In this case, a very thin, impermeable subgasket/barrier plate 140 is used such that membranes 130 are in full contact in the open region, but cross-over hydrogen permeation is limited to the open region region to help limit hydrogen loss. However, as noted above, in some embodiments, subgasket/barrier plate 140 is not included. The $O_2$ splits up, and the oxygen atoms combine with protons to make water.

Each bipolar plate 110 and gasket 120 includes four notches 116, 128, respectively. However, any number and/or location of notches may be used without deviating from the scope of the invention. Indeed, in some embodiments, it may be desirable to crenellate the entire periphery of the bipolar plates and/or gaskets. Notches 116, 128 are aligned with one another in this embodiment, but this need not be the case in certain embodiments.

Somewhat similar to gaskets 120, membranes 130 also provide a decently good barrier to gas transport. Gas crossing over by permeation through the membrane would lead to fuel loss. This permeation is a significantly larger issue for small power levels, such as those provided by microwatt fuel cells.

In some embodiments, multiple layers (e.g., 2, 4, 16, etc.) of membrane material may be used to form membranes 130 without deviating from the scope of the invention. A couple of relatively thick membranes, such as Nafion™ 117 (7 mil, 175 um) or Nafion™ 1110 (10 mil, 250 um) could be combined to form a relatively thick membrane barrier to minimize gas cross-over and maximize membrane life. However, these products as-received do not contain radical scavengers, and thus require separate treatment or some other mechanism for introducing the radical scavengers to the fuel cell.

One known scavenger is cerium, which serves to catalyze the decomposition of free radical byproducts of the oxygen reduction cathode reaction that attacks the membrane material. The scavengers do not completely protect the membrane and thinning still occurs, but at a significantly slower thinning rate than without these scavengers. A commercial membrane that already contains radical scavengers, such as Nafion™ XL, can be used in some embodiments. However, these reinforced high-performance membranes are quite thin (about 1 mil or 25 um). Consequently, a stack of around 16 is used in some embodiments to build up a thickness in the range of a couple of the thick membranes.

Nafion™ XL and similar high-performance membranes typically use expanded polytetrafluoroethylene (ePTFE—similar to Gore-Tex®) as a reinforcement matrix that is impregnated throughout with the Nafion™ ionomer to provide a membrane with high ionic conductivity. While the ePTFE provides dimensional stability, its presence may become problematic as the stack of membranes thins due to free radical attack from the cathode side. If the free radical attack selectively removes the ionomer from within the ePTFE, ionic conductivity through the ePTFE may be lost and a barrier may thus be formed that negatively affects cell performance.

In order to function as ion transporters, membranes 130 have a low pH and function similar to an immobilized acid. For instance, sulfonic acids may be used in some embodiments, which may have a pH equivalent to one molar sulfuric acid. The sulfonic acid may be perfluorinated, having a polytetrafluoroethene (PTFE, a trade name of which is Teflon®)-type backbone with sulfuric acid on side chains. The trade name for one such perfluorinated sulfonic acid is Nafion® by DuPont®. The lack of hydrogen prevents the sulfonic acid from attacking itself.

Membranes 130 do not include notches. This exposes "fins" of membranes 130 in the assembled stack, thus significantly increasing the exposed area of the membranes to facilitate water removal. Water generated at a cathode GDE 126 diffuses through membranes 130 to the periphery and the areas in notches 116, 128 to disperse to the surrounding environment. Conventional fuel cells are flow-through designs where hydrogen or air flows through and product water results. Such fuel cells need to constantly be flushed. This differs from the "dead ended" configuration of some embodiments, where reactants do not flow through.

The surrounding environment may be "dry" due to the use of desiccants in the surrounding enclosure and/or due to low or near vacuum external pressures (e.g., Earth vacuum configurations or space applications). This is possible due to the low power levels, and consequently, relatively small amounts of water that are produced. However, with too much water removal, membranes 130 and electrodes 126 would dry out, leading to poor performance. Thus, the amount of water that is removed, the amount and location of desiccants, etc. should be tailored to the specific design.

The use of membranes 130 (e.g., ionomeric membranes) to remove product water to the periphery of cell 100 in a stack and then the use of notches 116, 128 around the periphery of gaskets 120 and bipolar plates 110 to facilitate the evaporation/sublimation of fuel cell product water of cell 100 from the periphery of membranes 130 is novel. An additional novel contribution to water removal in some embodiments is the use of gaskets with low gas permeability, but high water permeability, to help facilitate water removal while minimizing the reactant loss.

Figure 2:
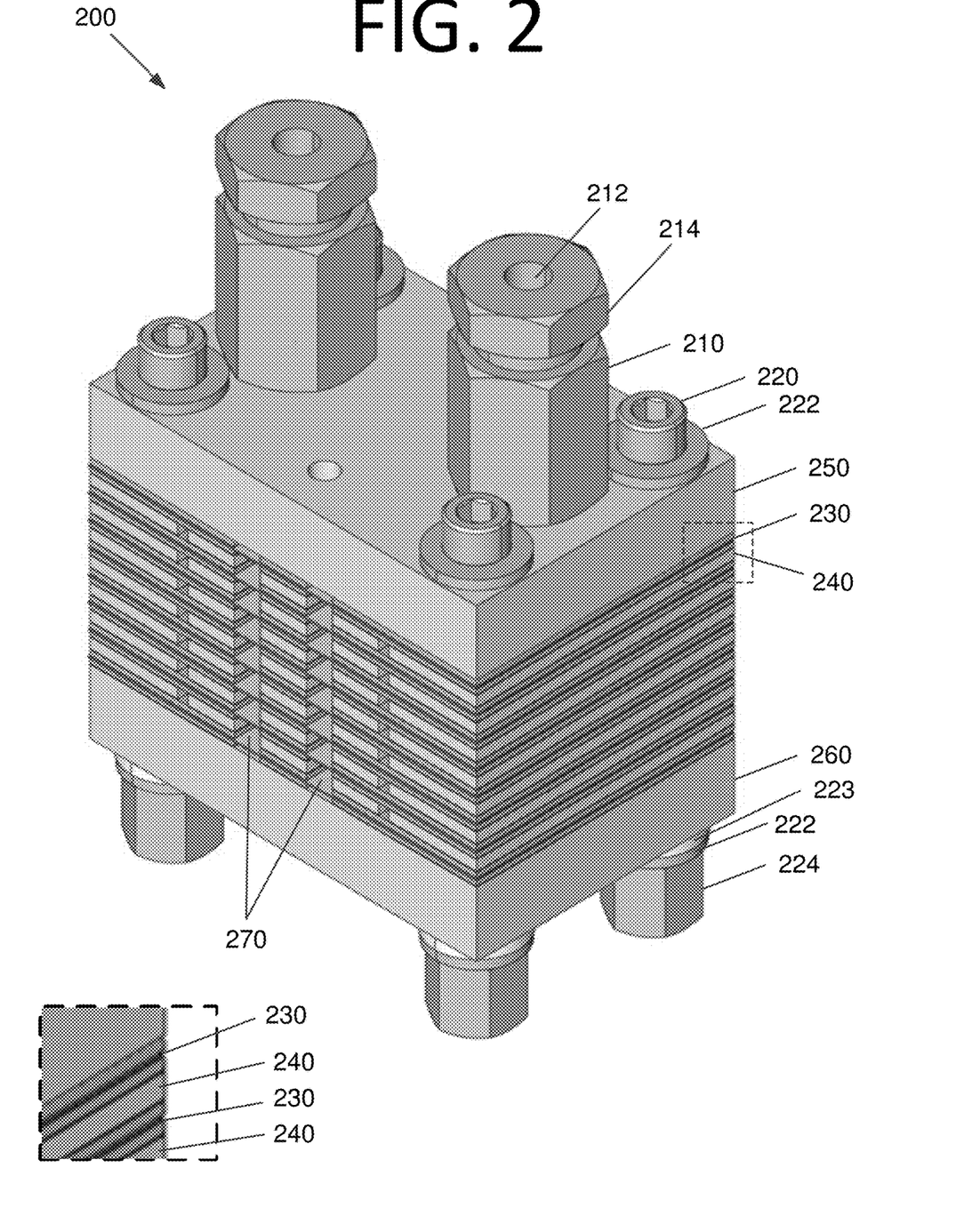
FIG. 2 is a perspective view illustrating an 8-cell assembled microwatt fuel cell stack, according to an embodiment of the present invention.

FIG. 2 is a perspective view illustrating an 8-cell assembled microwatt fuel cell stack, according to an embodiment of the present invention. In some embodiments, the plates, membranes, and GDEs of stack 200 may be those of FIGS. 1A and 1B. Stack 200 is designed to operate with dead-ended gas flows in this embodiment with water removal via passive membrane diffusion to notches in the bipolar plates. Both $H_2$ and $O_2$ are supplied directly to microwatt fuel cell stack 200 via an external source (not shown). There are multiple cells in this embodiment because each only supplies a relatively small voltage (e.g., approximately 0.7 to 0.8 V). By stacking multiple cells, higher voltages can be achieved (e.g., at least 3.3V as a common electronics voltage so a direct current (DC) converter can be used). However, while 8 cells are used in this embodiment, any desired number of cells may be used without deviating from the scope of the invention.

In some embodiments, stack 200 may be built with layered membranes of approximately 100 µm to 400 µm thick, respectively, to reduce cross-over and increase water wicking to the periphery. Also, membranes of different types may be used. For example, membranes with lower equivalent weight (e.g., high acid and hence water content) could be used on the cathode side to facilitate product water removal and higher equivalent weight membranes could be used on the anode side to aid in decreasing hydrogen cross-over. Each individual cell may have the same configuration of membranes as the other cells, but how the membranes are stacked can be done various potentially beneficial ways including, but not limited to, the example above.

Tube fittings 210 provide interfaces into which hydrogen and oxygen feed tubes slide via openings 212. In some embodiments, commercial tube fittings, such as part #M3CB5H-16-303 from Beswick® engineering, may be used. Screws 214 compress respective ferrules (not visible) to seal against and hold the respective tubes in place. Four sheathed tie bolts 220 with associated washers 222, 223 and a nut 224 hold components of stack 200 in place. The tie bolt sheaths (not shown) and washers 223 are electrically insulating to prevent shorting between the components.

Per the above, stack 200 includes eight cells 230, with adjacent cells sharing a bipolar plate 240. A magnified view of a section of stack 200, as indicated by the dashed line box, is shown in the lower left. Cells 230 are sandwiched at both ends by an upper endplate 250 and a lower endplate 260. Vertical columns of notches and fins 270 facilitate water removal. However, it should be noted that in some embodiments, the columns may be diagonal, curved, not extend all the way from the top to the bottom of the cells, and/or have any other suitable shape or configuration without deviating from the scope of the invention.

Figure 3:
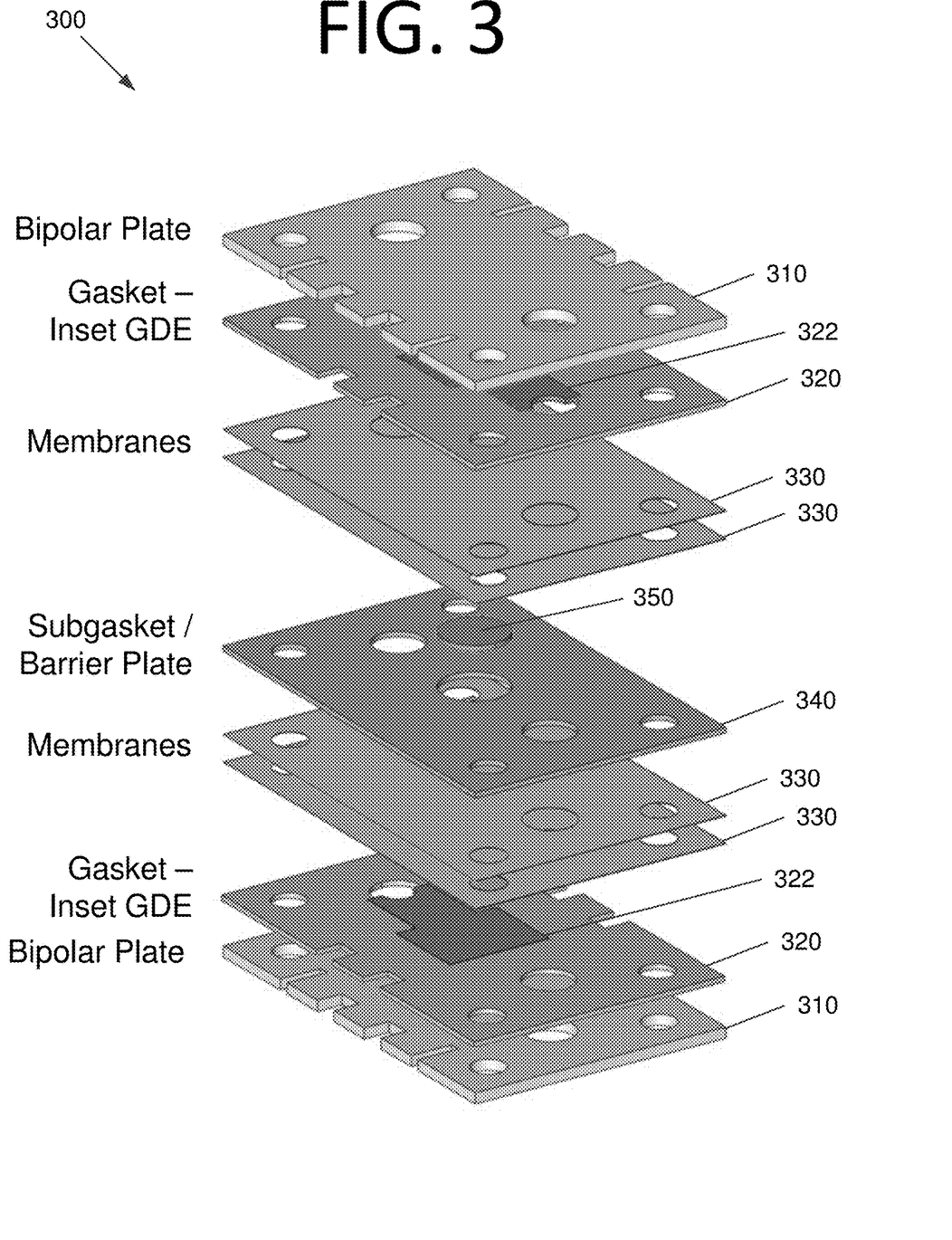
FIG. 3 is an exploded perspective view illustrating plates of a microwatt fuel cell using a barrier plate and a membrane plug, according to an embodiment of the present invention.

FIG. 3 is an exploded perspective view illustrating plates of a microwatt fuel cell 300 using a barrier plate 340 and a membrane plug 350, according to an embodiment of the present invention. Like cell 100 of FIGS. 1A and 1B, cell 300 includes a pair of bipolar plates 310, a pair of gaskets 320 with respective GDEs 322, and a subgasket/barrier plate 340. However, cell 300 also includes a membrane plug 350 that fits within a respective opening in subgasket/barrier plate 340. Cell 300 also includes four membranes 330 instead of two. Indeed, any suitable number and thickness of membranes may be used without deviating from the scope of the invention. Use of subgasket/barrier plate 340 and membrane plug 350 may decrease cross-over permeation while constraining water removal to avoid excessive dryness.

Since the intent of these power sources is to provide power for extended periods in some embodiments, ideally decades, the efficient use of the reactants is of paramount importance. The $H_2$ and $O_2$ permeability of the membranes becomes a significant factor as "cross-over" of the gases through the membranes in the active area can be an appreciable loss of the reactants, and even the electron leakage can be a noticeable contribution. One solution is to use thicker membranes. For instance, membranes 330 may be four commercial 25 µm thick DuPont® XL membranes (100 µm total thickness). Hydrogen cross-over may exceed 10 µA per cell for a 0.2 $cm^2$ active area (or about 80 µA) for an 8-cell stack, which exceeds the reactant consumption for the stack to provide 50 µW.

To decrease the cross-over, thicker membranes can be used, or if this results in excessive dryness, the permeation area of the membrane can be necked down using membrane plug 350 inserted into subgasket/barrier plate 340. This way, GDEs 322 can be fully covered with membranes 330 to maximize kinetics. Also, a sufficient thickness of membranes 330 can run to the periphery to remove water, but the permeable area of membranes 330 can be made much thicker or even necked down to minimize cross-over with the use of membrane plug 350 inserted into subgasket/barrier plate 340.

As mentioned above, water removal can be enhanced using gaskets with high water permeability and low gas permeability. Very good wide temperature range performance has been obtained in a prototype using gaskets formed from double-sided acrylic adhesive tapes, such as those manufactured by 3M®. Sustained performance at −55° C. with only 100 µm thick membranes indicates appreciable water removal via the acrylic gaskets in this prototype, which are also very gas tight. This is demonstrated by a total leak rate for a prototype 8-cell stack in vacuum using a 5 psig hydrogen feed of only about 7 μA.

There are some concerns with gasket creep and the long-term stability of the acrylic adhesive. Experiments with a polyester-reinforced Viton® sheet have shown improved mechanical characteristics. However, the low water permeability affects the ability of the stacks to remove sufficient water at −55° C. Other materials or combinations of materials that provide the desirable combination of properties (e.g., compression recovery, creep resistance, high water and low gas permeabilities, etc.) may be used, such as reinforced elastomeric polyurethanes or composites of Nylon® and silicone.

The majority of the life and environmental testing was performed at a relatively low 3 psig to minimize cross-over. However, water removal can also be enhanced by pressurizing the reactants compared to the surrounding environment with the pressure gradient taking advantage of the inherent hydraulic permeability of the membranes to push water to the periphery. Calculations indicate that even modest pressure differentials significantly increase the removal of water through the membranes. However, the higher pressure will result in an increase in cross-over through the membrane, and hence, reactant loss. A compromise should thus be struck between operational longevity at very cold temperatures and the system fuel utilization efficiency.

Figure 4:
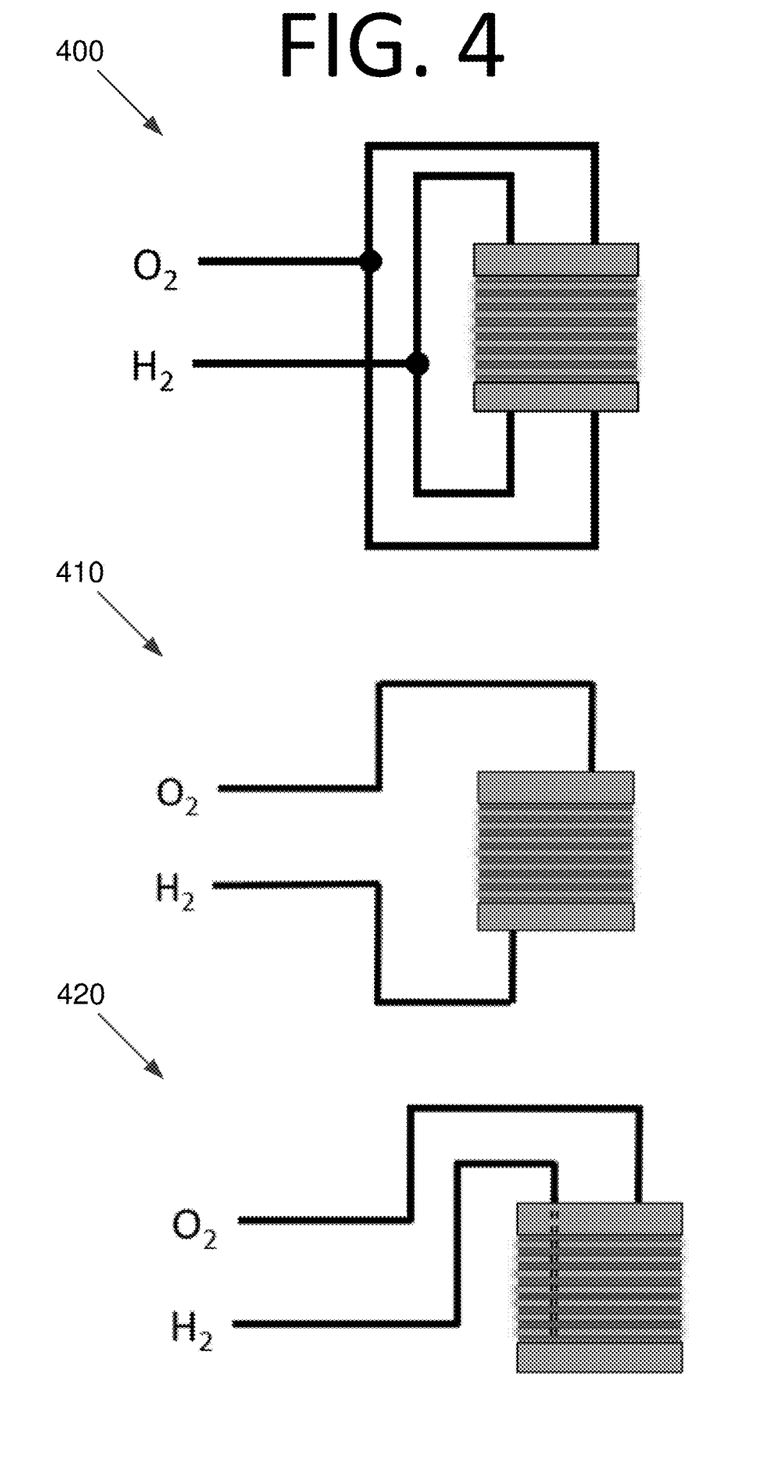
FIG. 4 illustrates alternative reactant feed options for a microwatt fuel cell stack, according to an embodiment of the present invention.

As noted above, the ability to remove product water is greatly decreased at very low temperatures. When the removal rate is marginal, water tends to accumulate at the most humid locations within the stack, such as the cell furthest from the (dry) reactant feed next to the relatively cool end plate at the far end, which can lead to cell flooding and loss of performance. One solution is to supply both reactants from both ends of the stack, which requires endplates outfitted with tube fittings on both sides similar to endplate 250 of FIG. 2, for instance. Such a reactant feed configuration 400 is shown in FIG. 4. This way, the dry gasses are entering from both ends with this double-ended feed and the most humid region becomes the middle of the stack. However, this region resists water accumulation as it is also the warmest location. Overall, the conditions across the stack are then relatively uniform and no individual cell is most susceptible to water flooding.

To simplify the tubing connections, feeding $H_2$ and $O_2$ from opposite ends may suffice to alleviate the flooding difficulty, as is done in reactant feed configuration 410 of FIG. 4. With this counter-flow scheme, each end cell has a dry stream of gas passing through that can help dry out the dead-end side of the other reactant manifold. An alternative configuration that allows both fittings to be on the same end is to drill out one of the fittings and extend the feed tube all the way through the stack internally until it reaches the far endplate, as is shown in reactant feed configuration 420 of FIG. 4.

Figure 5:
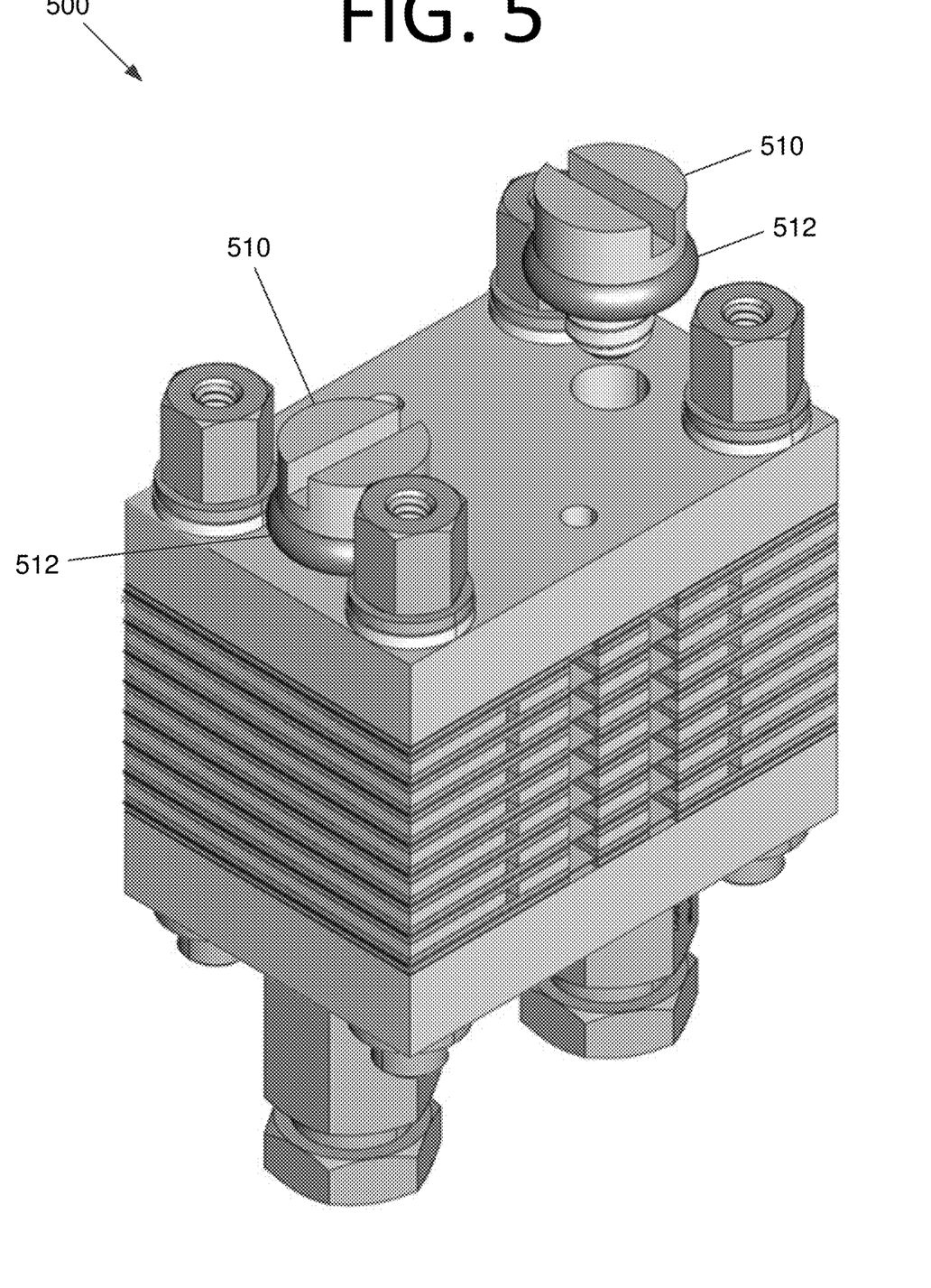
FIG. 5 is an upside down perspective view illustrating a microwatt fuel cell stack with Nylon® plugs, according to an embodiment of the present invention.

With the use of relatively water impermeable Viton® gaskets, water/ice would collect in the manifold at the cells furthest from the hydrogen gas inlet, resulting in a near-complete loss of performance in these cells even when the gases were fed from opposite ends as described above. When the gases are fed from the same end and Nylon® 6/6 plugs made from one or more synthetic polymers based on aliphatic or semi-aromatic polyamides (e.g., Nylon®) with O-ring seals are installed instead of tube fittings in the endplate at the far end, the Viton® gasket stack could tolerate −55° C. without excess performance loss in the far end cells. Such a stack 500 is shown in FIG. 5, which includes Nylon® plugs 510 with O-ring seals 512.

Nylon® has a particularly high water permeability coefficient that appears to help remove water to prevent the water from collecting in this immediately adjacent region. This configuration fortuitously provides water removal ports exactly where accumulation is most likely to occur. The ratio of water to hydrogen permeability coefficients in Nylon® is about 300 at room temperature (likely higher at lower temperatures). Thus, hydrogen loss is minimal compared to the water removal capability.

Figure 6:
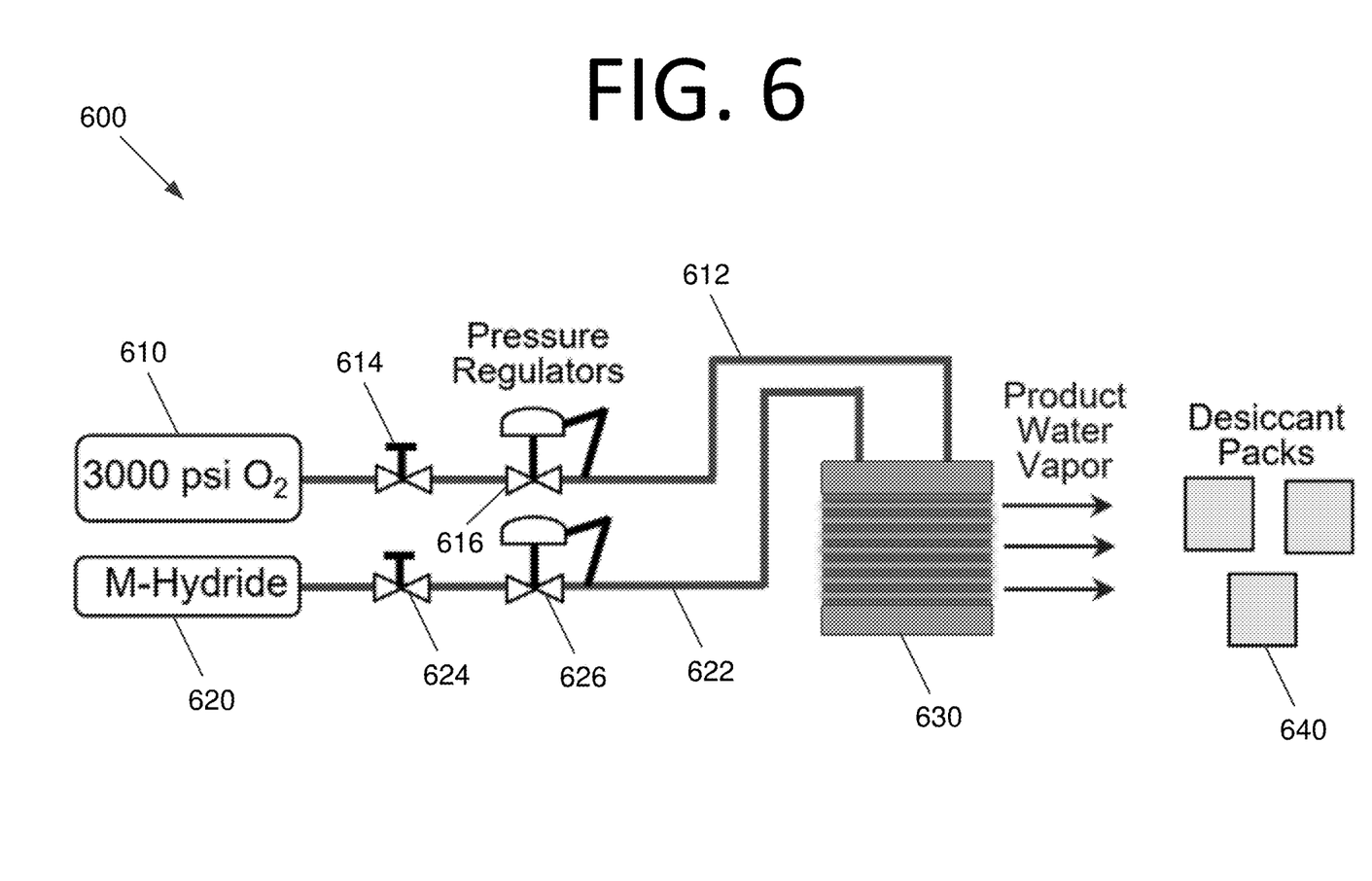
FIG. 6 is an architectural diagram illustrating a microwatt fuel cell system, according to an embodiment of the present invention.

FIG. 6 is an architectural diagram illustrating a microwatt fuel cell system 600, according to an embodiment of the present invention. System 600 includes an $O_2$ source 610 and an $H_2$ source 620. In this embodiment, $O_2$ source 610 contains $O_2$ at 3000 psi and $H_2$ source 620 includes at least one metal hydride. $O_2$ source 610 and $H_2$ source 620 are supplied to a microwatt fuel cell stack via gas lines 612, 622, respectively. Each gas line 612, 622 includes respective control valves 614, 624 and pressure regulators 616, 626. Water vapor produced by microwatt fuel cell stack 630 is absorbed by desiccant packs 640.

Figure 7:
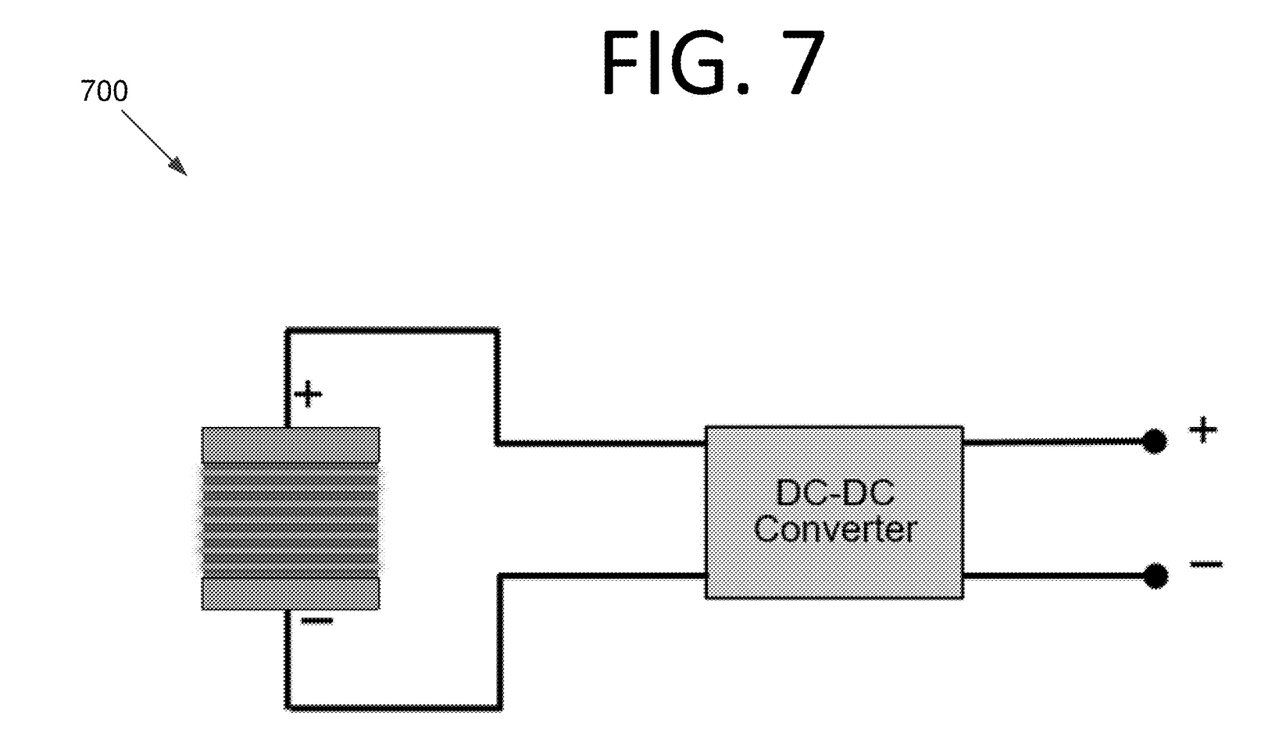
FIG. 7 is a circuit diagram illustrating an 8-cell microwatt fuel cell stack and a DC-DC converter, according to an embodiment of the present invention.

Different electrical configurations are possible with the microwatt fuel cell stacks of some embodiments. For instance, circuit diagram 700 of FIG. 7 shows a microwatt fuel cell stack connected to a DC-DC converter. This configuration may be beneficial when supercapacitors are not viable and/or the fuel cell stack tolerates voltage cycling reasonably well.

Alternatively, the fuel cell stack can be paired with a capacitor or supercapacitor array to minimize voltage swings during power pulses. Two example configurations with supercapacitors are shown in circuit diagrams 800 and 900 of FIGS. 8 and 9, respectively. In these cases, the relatively low voltage rated supercapacitors that are arrayed in series by necessity, can become unbalanced over time, limiting overall supercapacitor performance. Consequently, the supercapacitors are balanced by secondary electrical connections from each individual supercapacitor to a matching pair of cells in the fuel cell stack. Cycling deficiencies or losses in any one supercapacitor are compensated by the supporting pair of fuel cells, preventing an otherwise irreversible loss in capacity.

Figure 8:
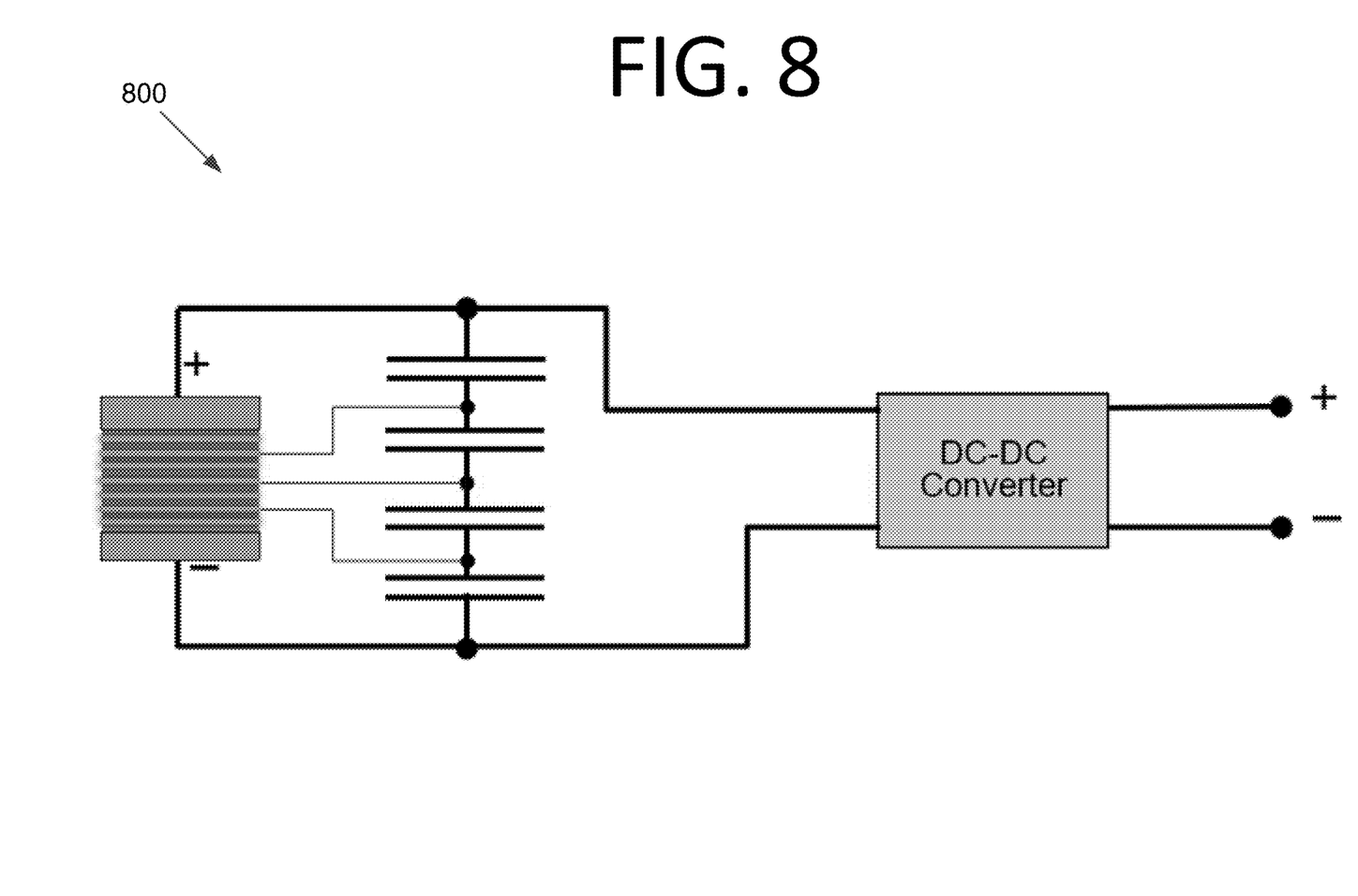
FIG. 8 is a circuit diagram illustrating an 8-cell microwatt fuel cell stack, four supercapacitors, and a DC-DC converter, according to an embodiment of the present invention.
Figure 9:
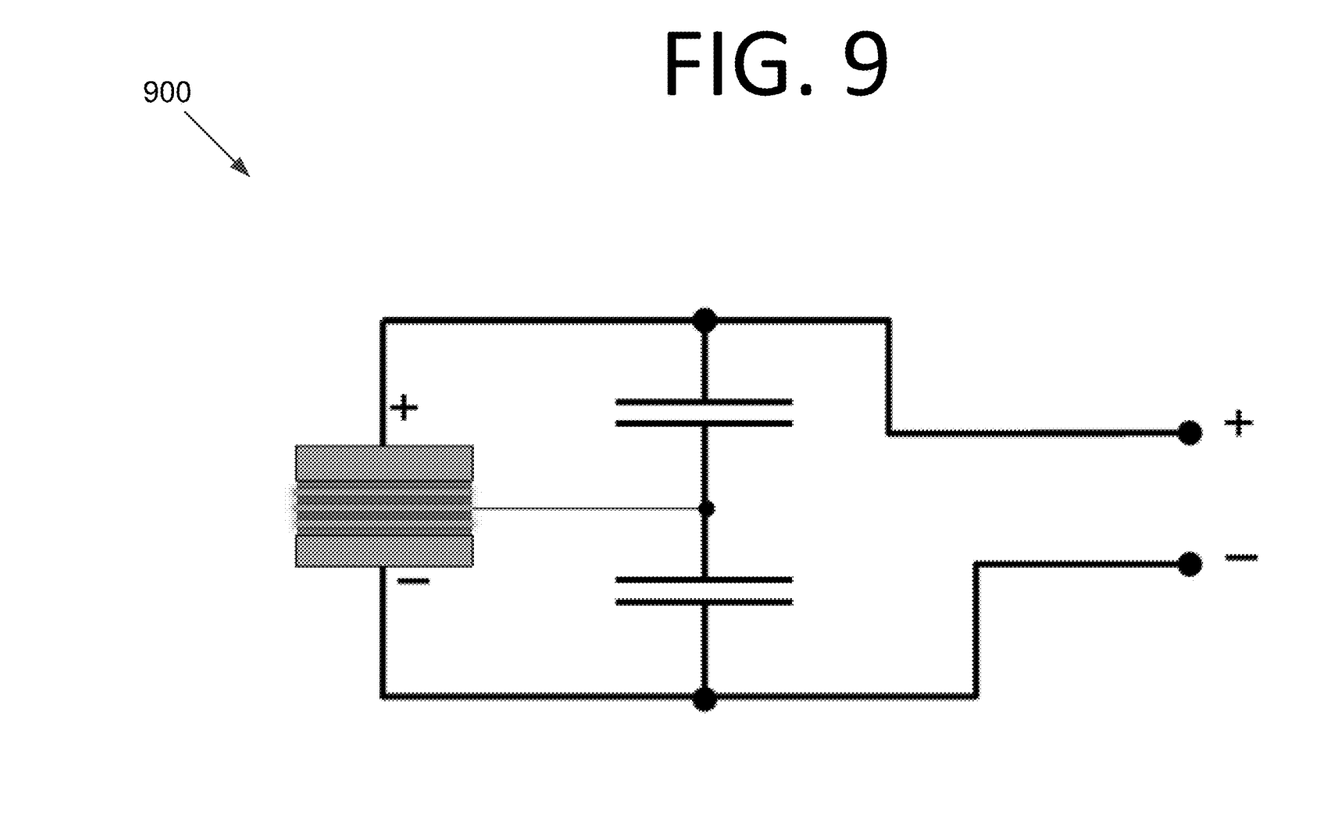
FIG. 9 is a circuit diagram illustrating a 4-cell microwatt fuel cell stack in parallel with two supercapacitors, according to an embodiment of the present invention.

The configuration of FIG. 8 may be beneficial when the fuel cell stack does not tolerate voltage cycling well. In some embodiments, the cells in this configuration may drop all the way down to 0.44 V per cell and still provide the designed converter output voltage to maximize stack life. The configuration of FIG. 9 may be beneficial if both the fuel cell stack and the supercapacitors are highly durable, and/or a DC-DC converter is not viable. This provides little leeway with the stack life, as performance can only drop to 0.75 V per cell to supply the necessary output voltage in some embodiments.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A fuel cell stack, comprising:
a plurality of fuel cells comprising a plurality of layers, the plurality of fuel cells each comprising:
a membrane,
a first gasket on a side of the membrane, the first gasket comprising a first gas diffusion electrode (GDE) that, in operation, is provided with a hydrogen gas supply via a hydrogen manifold, and
a second gasket on an opposite side of the membrane with respect to the first gasket, the second gasket comprising a second GDE that, in operation, is provided with an oxygen gas supply via an oxygen manifold, wherein
a water permeability coefficient of the first gasket and the second gasket is greater than a gas permeability coefficient of the first gasket and the second gasket,
the membrane comprises a plurality of fins, and
the first gasket and the second gasket each comprise at least one notch such that at least one respective fin of the plurality of fins of the membrane is exposed by the at least one notch in the first gasket and the second gasket.

2. The fuel cell stack of claim 1, wherein
each fuel cell of the plurality of fuel cells further comprises at least one bipolar plate with at least one notch matching the at least one notch of an adjacent one of the first gasket or the second gasket, and
each fuel cell shares a bipolar plate with a fuel cell directly above and below it, with the exception of a top cell that does not have a bipolar plate above the top fuel cell and a bottom cell that does not have a bipolar plate below the bottom fuel cell.

3. The fuel cell stack of claim 2, wherein
the at least one bipolar plate comprises titanium that is nitrided, platinum-coated, or gold coated,
the membrane comprises a sulfonated tetrafluoroethylene-based fluoropolymer-copolymer, and
the first GDE and the second GDE comprise platinum black.

4. The fuel cell stack of claim 1, wherein the first gasket and the second gasket are oriented in opposite directions with respect to one another such that the first GDE and the second GDE are properly oriented to interface with the hydrogen manifold or the oxygen manifold, respectively.

5. The fuel cell stack of claim 1, wherein the fuel cell stack is configured such that both hydrogen gas and oxygen gas are supplied directly to the fuel cell stack in a dead-ended configuration and air is not provided.

6. The fuel cell stack of claim 1, wherein the first GDE and the second GDE serve as both an active electrode and a manifold port for the hydrogen manifold and the oxygen manifold, respectively.

7. The fuel cell stack of claim 1, wherein each fuel cell comprises a barrier plate.

8. The fuel cell stack of claim 1, wherein each layer of each fuel cell comprises holes defining passageways for the hydrogen and oxygen manifolds, respectively.

9. The fuel cell stack of claim 8, wherein a bottom fuel cell of the plurality of fuel cells comprises an endplate that does not include holes for the hydrogen and oxygen manifolds.

10. The fuel cell stack of claim 8, wherein
a bottom fuel cell of the plurality of fuel cells comprises an endplate comprising holes for the hydrogen and oxygen manifolds,
the fuel cell stack further comprises respective plugs and O-ring seals for each manifold hole of the endplate, and
the plugs are one or more orders of magnitude more permeable to water than gas to selectively remove water proximate to the plugs.

11. The fuel cell of claim 1, wherein
the first GDE and the second GDE each comprise a tongue, a throat, and a head, and
in operation, gas flows from the tongue through the throat and on to the head.

12. The fuel cell stack of claim 11, wherein the throat of the first GDE and the second GDE is flush with, and has a same compressed thickness as, the first gasket and the second gasket, respectively.

13. The fuel cell stack of claim 11, wherein the tongue and the throat connect the head of the first GDE and the second GDE to the hydrogen manifold and the oxygen manifold, respectively.

14. A fuel cell, comprising:
a membrane comprising a plurality of fins,
a first gasket on a side of the membrane, the first gasket comprising a first gas diffusion electrode (GDE) that, in operation, is provided with a hydrogen gas supply via a hydrogen manifold, and
a second gasket on an opposite side of the membrane with respect to the first gasket, the second gasket comprising a second GDE that, in operation, is provided with an oxygen gas supply via an oxygen manifold, wherein the first gasket and the second gasket each comprise at least one notch such that respective membrane fins are exposed by the at least one notch in the first gasket and the second gasket, and a water permeability coefficient of the first gasket and the second gasket is greater than a gas permeability coefficient of the first gasket and the second gasket.

15. The fuel cell of claim 14, further comprising:

at least one bipolar plate with at least one notch matching the at least one notch of an adjacent one of the first gasket or the second gasket.

16. The fuel cell of claim 14, wherein the first gasket and the second gasket are oriented in opposite directions with respect to one another such that the first GDE and the second GDE are properly oriented to interface with the hydrogen manifold or the oxygen manifold, respectively, the fuel cell stack is configured such that both hydrogen gas and oxygen gas are supplied directly to the fuel cell stack in a dead-ended configuration and air is not provided, and the first GDE and the second GDE serve as both an active electrode and a manifold port for the hydrogen manifold and the oxygen manifold, respectively.

17. The fuel cell of claim 14, further comprising:

holes defining passageways for the hydrogen and oxygen manifolds, respectively;

an endplate comprising holes for the hydrogen and oxygen manifolds; and respective plugs and O-ring seals for each manifold hole of the endplate, wherein the plugs are one or more orders of magnitude more permeable to water than gas to selectively remove water proximate to the plugs.

18. The fuel cell of claim 14, wherein the first GDE and the second GDE each comprise a tongue, a throat, and a head, in operation, gas flows from the tongue through the throat and on to the head, the throat of the first GDE and the second GDE is flush with, and has a same compressed thickness as, the first gasket and the second gasket, respectively, and the tongue and the throat connect the head of the first GDE and the second GDE to the hydrogen manifold and the oxygen manifold, respectively.

19. A microwatt fuel cell, comprising:

a membrane comprising a plurality of fins, a first gasket on a side of the membrane, the first gasket comprising a first gas diffusion electrode (GDE) that, in operation, is provided with a hydrogen gas supply via a hydrogen manifold, and a second gasket on an opposite side of the membrane with respect to the first gasket, the second gasket comprising a second GDE that, in operation, is provided with an oxygen gas supply via an oxygen manifold, wherein the first GDE and the second GDE each comprise a tongue, a throat, and a head, the tongue and the throat connect the head of the first GDE and the second GDE to the hydrogen manifold and the oxygen manifold, respectively, a water permeability coefficient of the first gasket and the second gasket is greater than a gas permeability coefficient of the first gasket and the second gasket, and the first gasket and the second gasket each comprise at least one notch such that at least one respective fin of the plurality of fins of the membrane is exposed by the at least one notch in the first gasket and the second gasket.

\* \* \* \* \*